United States Patent [19]

Bigan et al.

[11] Patent Number: 5,073,809
[45] Date of Patent: Dec. 17, 1991

[54] ELECTRO-OPTIC MODULATION METHOD AND DEVICE USING THE LOW-ENERGY OBLIQUE TRANSITION OF A HIGHLY COUPLED SUPER-GRID

[75] Inventors: Erwan Bigan, Paris; Michel Allovon, Fontenay; Paul Voisin, Paris, all of France

[73] Assignees: French State Represented by the Minister of Post, Telecommunications and Space (Centre National D'Etudes Des Telecommunications), Issy Les Moulineaux; Centre National De La Recherche Scientifique, Paris, both of France

[21] Appl. No.: 620,572

[22] Filed: Dec. 3, 1990

[30] Foreign Application Priority Data

Dec. 1, 1989 [FR] France ................... 89-15909

[51] Int. Cl.$^5$ .............................................. H01L 27/14
[52] U.S. Cl. ........................................ 357/30; 357/19; 357/16; 357/4; 357/58; 385/4; 385/8
[58] Field of Search ................ 357/30 C, 30 P, 30 E, 357/16, 4, 58, 19; 350/96.14, 96.13

[56] References Cited

U.S. PATENT DOCUMENTS

| 4,450,463 | 5/1984 | Chin | 357/30 E |
| 4,679,061 | 7/1987 | Capasso et al. | 357/30 E X |
| 4,716,449 | 12/1987 | Miller | 357/30 E |
| 4,800,262 | 1/1989 | Lentine | 357/4 X |
| 4,833,511 | 5/1989 | Sugimoto | 357/30 E X |
| 4,882,607 | 11/1989 | Shinada | 357/19 |

FOREIGN PATENT DOCUMENTS

| 0155802 | 9/1985 | European Pat. Off. |
| 0328214 | 8/1989 | European Pat. Off. |
| 63-94230 | 4/1988 | Japan | 357/30 E X |

OTHER PUBLICATIONS

Noda et al., "High-Speed Electroabsorption Modulator with Strip-Loaded GaInAsP Planar Waveguide," 1986 IEEE/Journal of Lightwave Technology, vol. LT-4, No. 10, Oct. 1986, pp. 1445-1453.

Yan et al., "Room-Temperature Two-Dimension Excitonic Exchange and Blue Shift of Absorption Edge in GaAs/AlGaAs Superlattices Under an Electric Field," Appl. Phys. Lett. 54(16), 17 Apr. 1989 pp. 1549-1551.

Brochure-1986 IEEE/Journal of Lightwave Technology, vol. LT-4, No. 10, Oct. 1986 "High-Speed Electroabsorption Modulator With Strip-Loaded GaInAsP Planar Waveguide"-Yukio Noda, etc. pp. 1445-1453.

Brochure-Appl. Phys. Lett. 54(16), 17 Apr. 1989/"Room-Temperature Two-Dimension Exciton Exchange and Blue Shift of Absorption Edge in GaAs/AlGaAs Superlattices Under an Electric Field"-R. H. Yan, etc.; pp. 1549-1551.

Primary Examiner—William Mintel
Attorney, Agent, or Firm—Oblon, Spivak, McClelland, Maier & Neustadt

[57] ABSTRACT

An Electro-Optic modulation method and device using a low-energy oblique transition of a tightly coupled super-grid. According to the present invention, a luminous beam is injected into a tightly coupled super-grid and an electric field (E) is applied to the super-grid whose amplitude is made to gradually vary so as to cause the intensity of the beam to vary. This beam is injected parallel to the plane of the films of the super-grid which guides the injected beam. The electric field is weak and applied along the growth direction of the super-grid, which provokes the appearance of a low energy oblique transition (TB) in a domain of wavelengths where the super-grid is transparent in the absence of any electric field. The super-grid is one whereby the wavelength of the luminous beam is contained in this domain. Such a device may find application in optical telecommunications systems.

14 Claims, 5 Drawing Sheets

ELECTRO-OPTIC MODULATION METHOD AND DEVICE USING THE LOW-ENERGY OBLIQUE TRANSITION OF A HIGHLY COUPLED SUPER-GRID

BACKGROUND OF THE INVENTION

1. Field of the Invention

The present invention concerns an electro-optic modulation method and device. The present invention may be used in optical telecommunications applications, such as for high flow numerical linkages over a long distance, as well as in electro-optic switching applications.

2. Discussion of the Background

The present invention forms a part of techniques for modulating the intensity of a luminous beam and which makes use of the phenomenon of electro-absorption. This phenomenon, which makes its appearance in a semiconductive material, concerns the optical absorption variations of a material under the effect of an electric field.

An electric field is applied to a semiconductor material, for example, with the aid of a PIN type diode 2, as shown in FIG. 1, or Schottky type diode which is polarized by a suitable device 4 and in which the intrinsic region I (not deliberately doped) contains the electro-absorbent material.

Certain techniques use a "perpendicular" type configuration, shown in FIG. 1-A, in which the light is sent onto the diode along the growth axis Z of the diode. Other techniques use a "guided waves" type configuration, shown in FIG. 1-B, in which the light is injected into the intrinsic region I parallel to the plane of the films P, I and N.

Compared with the "perpendicular" type configuration, this "guided waves" type configuration makes it possible to increase the interaction length on which the light is absorbed by the semiconductive material, namely the major part of the guided light situated in the region I.

The various techniques for modulating the intensity of a luminous beam, which use a "guided waves" type configuration, are differentiated by the physical effect implemented so as to obtain the optical absorption variation under the effect of an electric field.

Up until now, three physical effects have been proposed: the Franz-Keldysh effect, the Stark effect confined quantally and the "blue shift" effect of the absorption threshold in tightly coupled super-grid or super lattices.

The Franz-Keldysh effect is a "red shift" of the absorption threshold of a compact semiconductive material in the presence of an electric field.

FIG. 2-A shows a valence band BV and a conduction band BC of the semiconductive material which are separated by a forbidden band with a width Eg in the absence of any electric field (E=0).

FIG. 2-B shows that the application of an electric field to the semiconductive material (E≠0) breaks the periodicity of the material in the direction of this field, a periodicity which created the forbidden band.

This rupture of periodicity makes it possible to have electrons and holes in the "ex-forbidden" band in which the probability density of the presence of the electrons De and the probability density of the presence of the holes Dt are not nil.

There then appears a transition possibility at an energy EfK, which is less than Eg, which corresponds to a red shift of the absorption threshold.

This is diagrammatically illustrated by FIG. 3 which shows the absorption spectrum of a compact semiconductive material (curve of the variations of optical absorption a according to the wavelength l) in the presence of an electric field (E≠0) and in the absence of any electric field (E=0).

This red shift makes it possible to obtain absorption variations da (usually about 100 cm$^{-1}$ for an electric voltage of 5 V applied to a thickness of 0.5 micrometers) in the domain of wavelengths where the material is transparent and thus to embody a modulator functioning at the wavelength lo indicated in FIG. 3.

One example of the embodiment of a modulator using the Franz-Keldysh effect in a "guided waves" type configuration is described in an article by Y. Noda et al., published in the *IEEE Journal of Lightwave Technology*, vol. LT-4, No 10, Oct. 1986, pp. 1445-1553.

The quantally confined Stark effect is a red shift effect of the absorption threshold of a multiple quantum-well structure.

For the purpose of simplification, FIG. 4 shows the band structure of a quantum well in the absence of any electric field (FIG. 4-A) and in the presence of an electric field (FIG. 4-B).

FIG. 4-A shows that in the absence of any electric field, the basic energy level Et of the holes are separated by an energy Ee-t.

In the presence of an electric field (FIG. 4-B), these energy levels in the quantum wells are displaced and the electron-hole transition energy (Ee-t) is reduced by a quantity dE, hence resulting in a red shift of the absorption spectrum.

This is diagrammatically shown by FIG. 5 which shows the absorption spectrum of a multiple quantum-well structure in the presence of an electric field (E≠0) and in the absence of any electric field (E=0).

The absorption spectrum of this multiple quantum-well structure has a "staircase" working rate to which are added the excitonic absorption peaks whose origin is the electron/hole hydrogenoid interaction. The entire spectrum is red shifted by means of the quantally confined Stark effect.

Thus, it is possible to obtain highly significant absorption variations da in the domain of wavelengths where the structure is transparent (typically about 1000 cm$^{-1}$ for an electric voltage of 5 V applied to a thickness of 0.5 micrometers).

One example of an embodiment of a modulator using the quantally confined Stark effect in a "guided waves" type configuration is described in an article by K. Wakita et al, published in *Electronics Letters*, 13 Oct. 1988, vol. 24, No 21, pp. 1324 and 1325.

The blue shift effect of the absorption threshold in tightly coupled super-grids is described in an article by J. Bleuse, G. Bastard and P. Voisin published in *Phys. Rev. Lett.*, vol. 60, No. 3, 18 Jan. 1988, pp. 220-223, in an article by J. Bleuse, P. Voisin, M. Allovon and M. Quillec, published in *Applied Physics Letters*, 53 (26), 26 Dec. 1988, pp. 2632-2634, and in the French Patent Application No.

Mention is made hereafter of three essential parameters for evaluating the performance of a device for modulating the intensity of a luminous beam. These parameters are the extinction rate, attenuation in the "on" state and the control voltage of the device.

The extinction rate is the ratio of the luminous beam leaving the modulator in the "on" state to the luminous intensity leaving the modulator in the "off" state. This extinction rate may be expressed in percentages or in dBs. It needs to be as high as possible (typically about 20 dBs). It is directly related to the absorption variation.

Attenuation in the "on" stat is the ratio of the luminous intensity leaving the modulator in the "on" state to the luminous intensity entering into the modulator. This attenuation in the "on" state may be expressed in dBs. It needs to be as low as possible (typically less than or equal to about 3 dBs). It is directly related to the residual absorption in the domain of wavelengths where the electro-absorbent material of the modulator is transparent.

The control voltage of the device needs to be as weak as possible. It is directly related to the electric field to be applied to the electro-absorbent material the device contains.

In relation to these three parameters, the techniques which respectively use the three effects mentioned above exhibit the following drawbacks.

The modulators using the Franz-Keldysh effect and those modulators using the quantally confined Stark effect require that high electric fields be applied, usually about 10 V per micrometer, namely a voltage of 5 V applied to a thickness of 0.5 micrometers. Such control voltages result in a high energy dissipation in cases of fast modulation (frequencies of several GHz).

Modulators using the blue shift effect present significant attenuation in the "on" state (that is, when the electric field is not nil). This is valid for two reasons:

1) the operating point of a modulator of this type is situated on a wavelength extremely close to the absorption threshold; the enlargements linked to the temperature and the shortcomings of the super-grid make an absorption tail appear which is located towards the low energies and whose effects are considerably close to the absorption threshold;
2) at the same time as the blue shift, a low-energy "oblique" transition appears, this being shown in FIG. 8 described subsequently.

This attenuation in the "on" state is extremely considerable, as indicated on page 1551, left column, lines 6 to 11 of the article by R.H. Yan et al, published in *Applied Physics Letters*, vol. 54 (16), 17 Apr. 1989, pp. 1549 to 1551.

SUMMARY OF THE INVENTION

Accordingly, an object of the present invention is to provide a method and device to modulate the intensity of a luminous beam, the method and device not exhibiting the preceding drawbacks and exhibiting a high extinction rate (for example, about 20 dB), a weak control voltage (for example, about 1 V), and a low attenuation in the "on" state (for example, about 3 dB).

To this effect, the present invention uses one of the phenomena which penalize attenuation in the "on" state in the case of a blue shift, namely the appearance of the low-energy oblique transition (that is, with a large wavelength).

More precisely, an object of the present invention is first of all to provide a method to modulate the intensity of a luminous beam, this method including the injection of the luminous beam into an electro-absorbent semiconductive element, and applying to this element, an electric field whose amplitude is made to gradually vary so as to vary the intensity of the luminous beam. This method is characterized in that the electro-absorbent element includes a tightly coupled super-grid whose films are stacked along one direction which constitutes the growth direction of the super-grid, in that the luminous beam is injected into the super-grid parallel to the plane of the films of this super-grid, in that this super-grid is provided to guide the injected luminous beam, in that the electric field is weak and applied along the growth direction of the super-grid, which provokes the appearance of a low-energy oblique transition in a domain of wavelengths where the super-grid is transparent in the absence of any electric field, and in that the super-grid is such that the wavelength of the luminous beam is contained in this domain.

In the present invention, with a working wavelength l1 (wavelength of the luminous beam it is desired to modulate), a tightly coupled super-grid is therefore used whose absorption front in the absence of any electric field is found on a wavelength smaller than l1; the super-grid is therefore transparent to this wavelength l1 in the absence of any electric field.

On the other hand, in the modulation technique using the blue shift effect, with a working wavelength lo, a super-grid is used whose absorption front in the absence of any electric field is found on the wavelength smaller than lo; the super-grid is therefore opaque to this wavelength lo in the absence of any electric field.

A "weak electric field" is understood to be an electric field $\overline{E}$ so that the quantity $$\frac{e.|\overline{E}|.D}{dEe + dEt}$$

(where e is the elementary electronic charge and D is the sum of the width of a well and the width of a barrier) does not exceed about 1.

The thickness of the super-grid and the control voltage may thus be respectively about 0.5 micrometers and about 1 V.

According to one particular implementation of the method of the present invention, the super-grid is included in the core of a luminous wave guide, this wave guide comprising two films between which the core is situated and whose respective optical indices are smaller than the optical index of the super-grid.

The length of the wave guide is selected according to requirements (including, for example, the desired extinction rate and attenuation in the "on" state). It is adjustable by splitting.

The wave guide may be a PIN type diode which is polarized, the intrinsic region I of this diode containing the super-grid and its region P and N having optical indices smaller than the optical index of the super-grid.

With a luminous beam whose wavelength is about 1.5 micrometers, it is possible to use a super-grid resulting from the stacking of alternate GaInAs and AlInAs films or from the stacking of alternate GaInAs and InP films.

With a luminous beam whose wavelength is about 0.8 micrometers, it is possible, for example, to use a super-grid resulting from the stacking of alternate GaAs and GaAlAs films.

Of course, for other spectral windows, it is possible to have other semiconductive materials to produce super-grids making it possible to implement the present invention.

Another object of the present invention is to provide a device to modulate the intensity of a luminous beam, this device including an electro-absorbent semiconductive element for receiving the luminous beam, and a control means provided to apply to this element an electric voltage and to gradually vary the amplitude of the voltage so as to vary the intensity of the luminous beam. This device is characterized in that the electro-absorbent element includes a tightly coupled super-grid whose films are stacked along a direction which constitutes the growth direction of the super-grid, in that the super-grid is provided to guide the luminous beam when the latter is injected into the super-grid parallel to the plane of the films of this super-grid, in that the control means are provided to apply an electric voltage which generates in the super-grid a weak electric field and parallel to the growth direction of the super-grid, which provokes the appearance of a low-energy oblique transition in a domain of wavelengths where the super-grid is transparent in the absence of any electric field, and in that the super-grid is such that the wavelength of the luminous beam is contained in this domain.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1A:
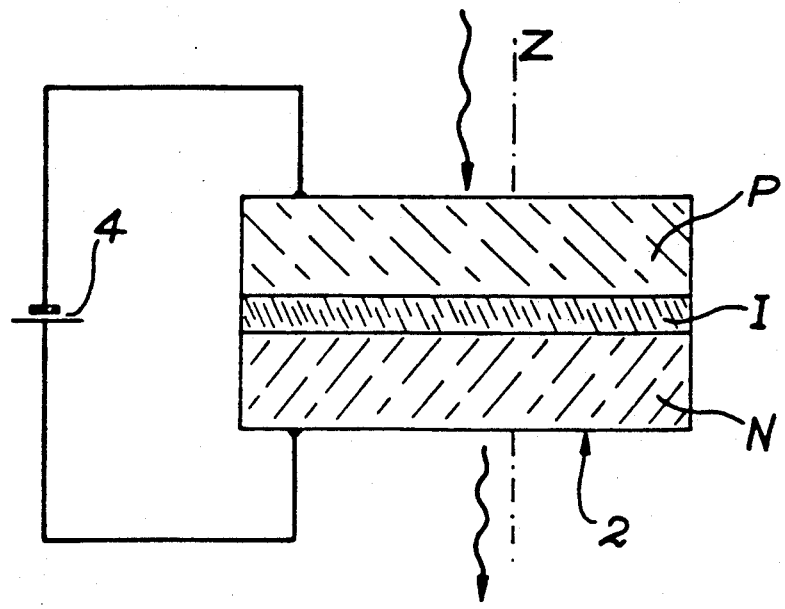
FIGS. 1A and 1B diagrammatically represent a PIN type diode whose intrinsic region I contains an electro-absorbent material which interacts with a luminous beam in a "perpendicular" type configuration (A) and in a "guided waves" type configuration (B)
Figure 1B:
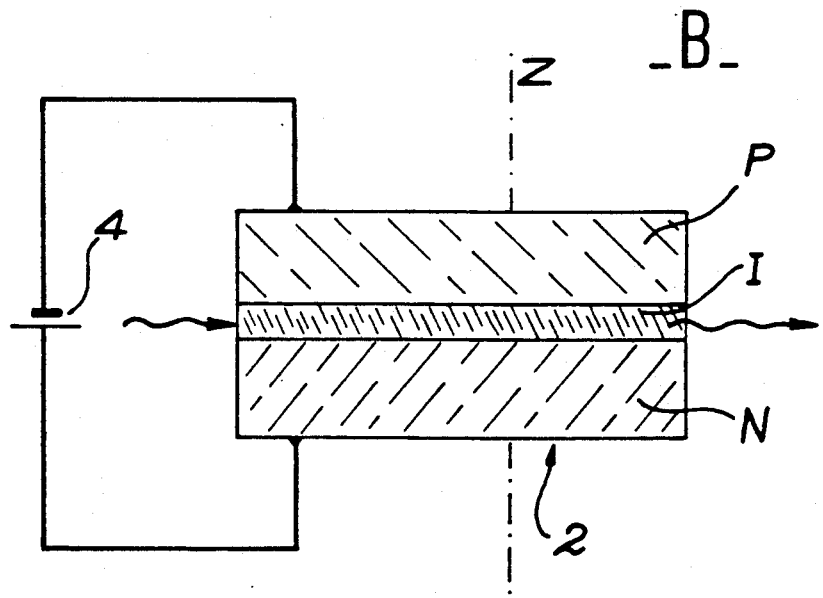
Figure 2A:
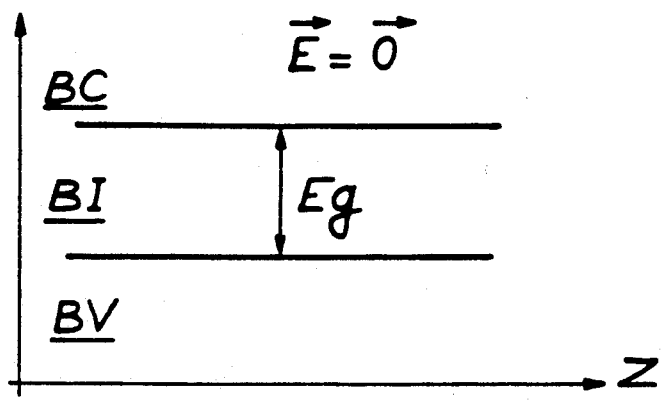
FIGS. 2A and 2B diagrammatically show the band structure of a compact semiconductive material in the absence of any electric field (A) and in the presence of an electric field (B)
Figure 2B:
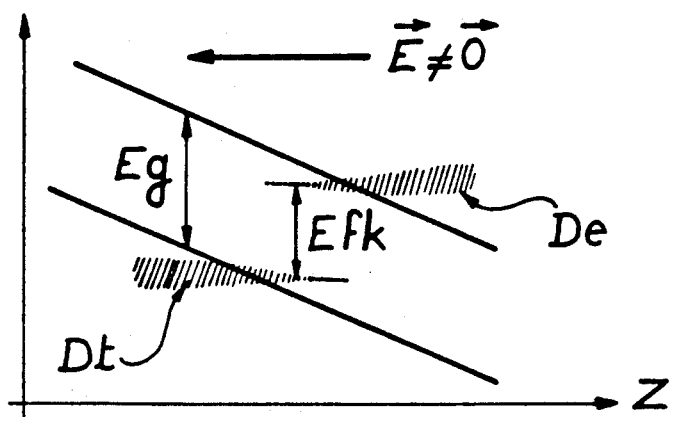
Figure 3:
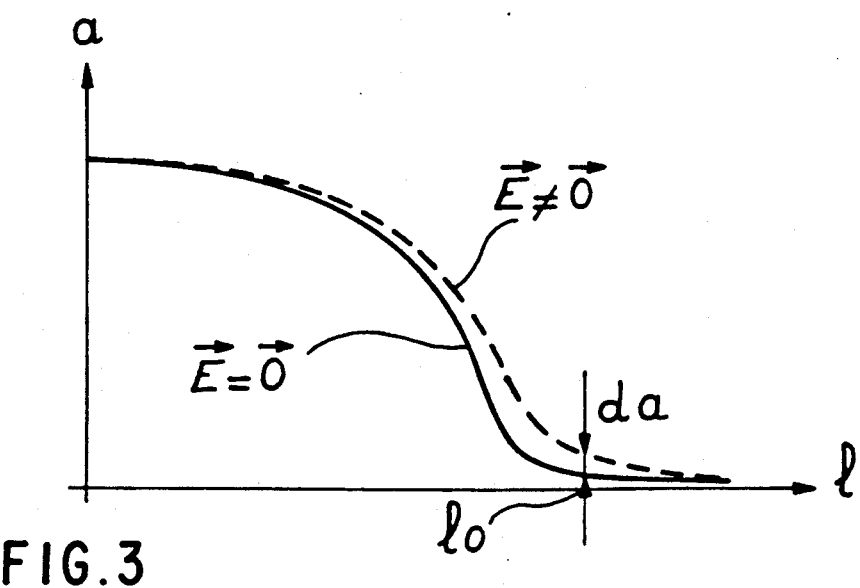
FIG. 3 shows the absorption spectrum in a semiconductive material in the absence of any electric field ($E=0$) and in the presence of an electric field ($E \neq 0$)
Figure 4A:
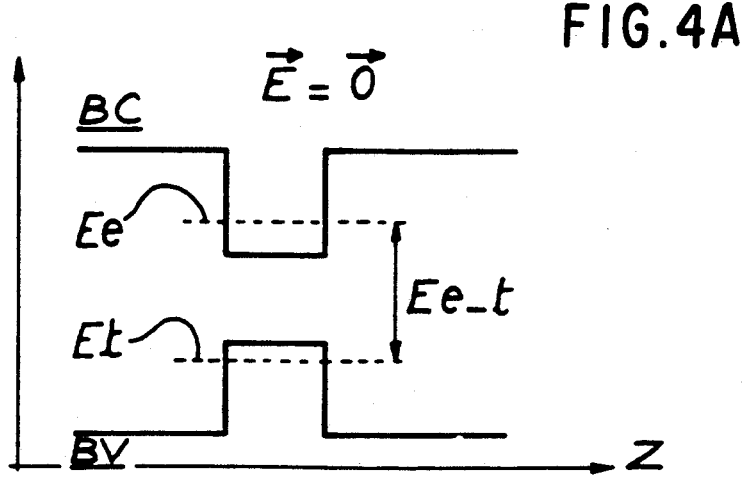
FIGS. 4A and 4B represent the band structure of a quantal well in the absence of any electric field (A) and in the presence of an electric field (B)
Figure 4B:
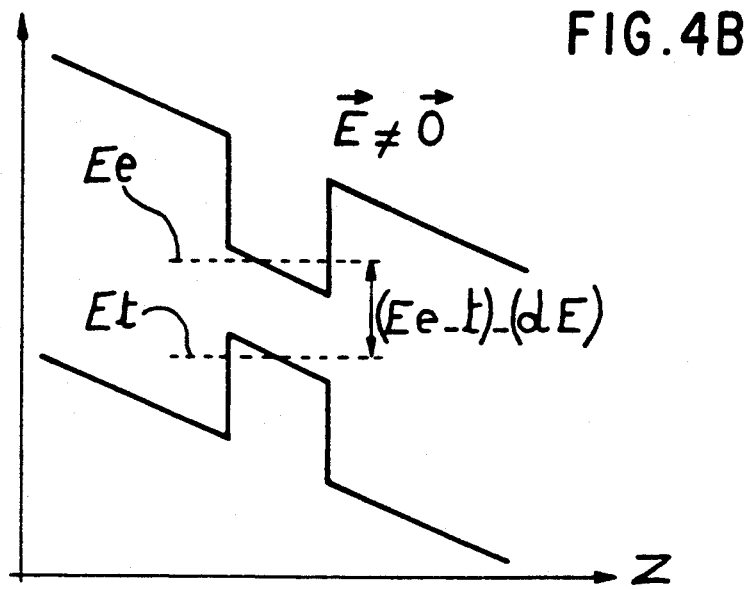
Figure 5:
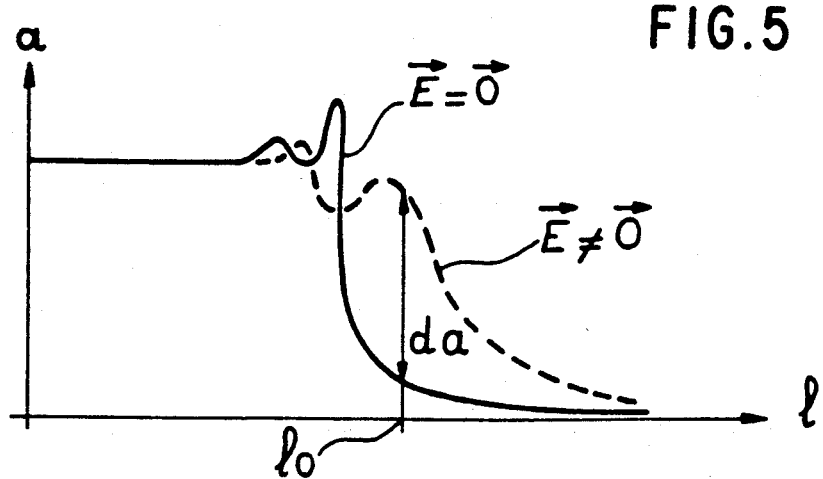
FIG. 5 represents the absorption spectrum of a quantal well structure in the absence of any electric field ($E=0$) and in the presence of an electric field ($E \neq 0$)
Figures 6A, 6B:
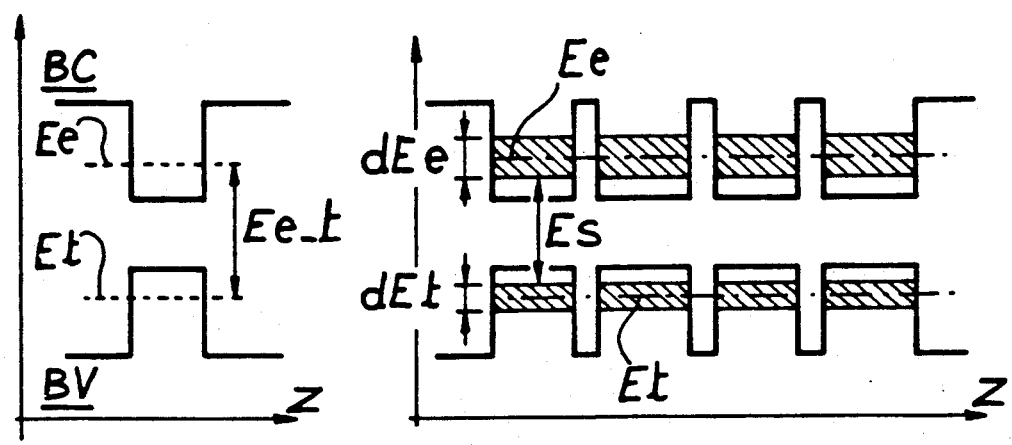
FIGS. 6A and 6B show the respective band structures of an isolated quantal well (A) and of a tightly coupled super-grid (B)
Figure 7:
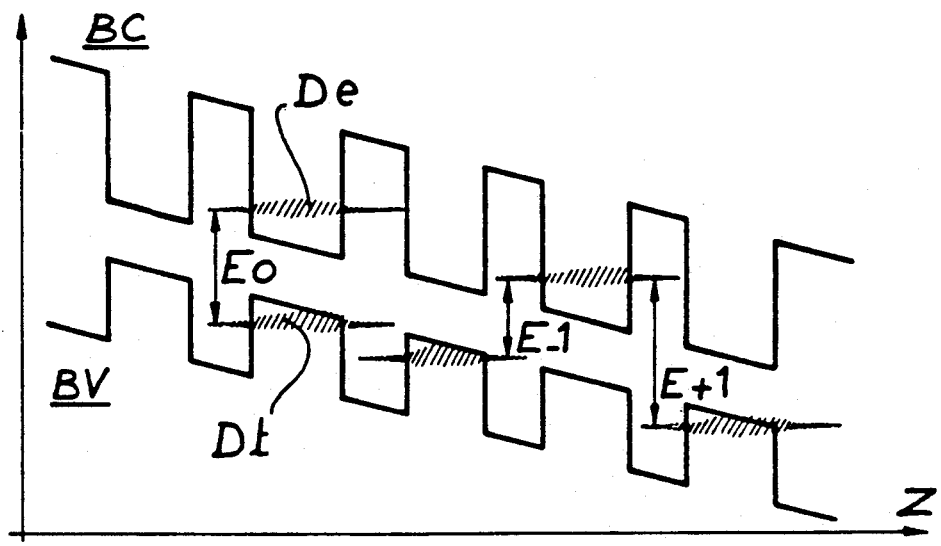
FIG. 7 shows the band structure of a tightly coupled super-grid in the presence of a weak electric field oriented along the growth direction of the super-grid.

Referring now to the drawings, wherein like reference numerals designate identical or corresponding parts throughout the several views, and more particularly to FIG. 7 thereof, which shows the band structure of a tightly coupled super-grid in the presence of a weak electric field applied along the growth direction of the super-grid. This super-grid may have a thickness of about 0.5 micrometers and is subjected to a voltage of 1 V suitable for generating the electric field.

The application of the electric field results in a blue shift of the absorption threshold of the super-grid. At the same time, oblique transitions between neighboring quantal wells appear with higher energy ($E_{+1}$) and with lower energy ($E_{-1}$) than the fundamental transition ($E_0$) of the super-grid.

FIG. 7 also shows the probability densities of the respective presence De and Dt of the electrons and holes which authorize these oblique transitions.

Figure 8:
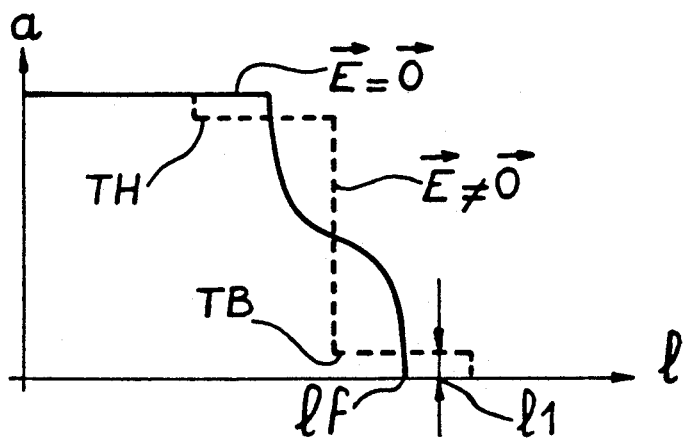
FIG. 8 shows the absorption spectrum of a tightly coupled super-grid in the absence of any electric field ($E=0$) and in the presence of a weak electric field ($E \neq 0$)

The absorption spectrum of the super-grid (variation of the absorption coefficient a according to the wavelength l) is shown on FIG. 8 in the absence of any electric field ($E=0$) and in the presence of a weak electric field ($E \neq 0$).

FIG. 8 shows the high energy oblique transition TH and the low-energy oblique transition TB which appear in the presence of the weak electric field.

According to the present invention, so as to embody a device (or modulator) for modulating luminous intensity, a tightly coupled super-grid is used as an electro-absorbent material and a luminous beam is made to interact with this super-grid in a "guided waves" type confiquration.

To this effect, a wave guide may be embodied whose core contains the super-grid, this super-grid being embodied in such a way that the wavelength lf corresponding to the absorption front of the super-grid in the absence of any electric field is smaller than the wavelength l1 of the luminous beam (operating wavelength) and, in addition, that the wavelength interval, corresponding to the low-energy oblique transition able to occur in the super-grid, contains l1.

The operating wavelength is thus in the transparency zone of the super-grid at rest, that is, in the absence of any electric field.

By applying a weak electric field along the growth direction of the super-grid, the low-energy transition appears to render the super-grid opaque to the operating wavelength l1.

The absorption variations obtained via the appearance of the low-energy oblique transition are relatively small (several hundreds of $cm^{-1}$). These are clearly smaller than those obtained via the quantally confined Stark effect or by means of blue shift. Nevertheless, they do have several advantages (1)-(3) listed below:

(1) They appear in a region where absorption in the "on" state is extremely small. By using an adequate wave guide length, it is thus possible to obtain a good extinction rate while retaining a slight attenuation in the "on" state.

(2) They appear for weak electric fields and thus for weak control voltages (usually 1 V applied to a thickness of 0.5 micrometers).

(3) They allow for operation over a relatively wide spectral range and thus allow for a large production tolerance of modulators conforming to the invention, as well as allowing for easy optimization of such modulators.

The use of a tightly coupled super-grid with a "guided waves" type configuration thus makes it possible to embody a luminous intensity modulator using low-energy oblique transition and simultaneously presenting the following characteristics of high extinction rate, low attenuation in the "on" state and weak control voltage.

The semiconductive materials and the corresponding growth techniques which make it possible to embody a modulation device conforming to the present invention are selected according to the desired operating wavelength.

Purely by way of indication and being in no way restrictive, for operating around 0.8 micrometers, the system of materials (well/barrier) selected may be (GaAs/GaAlAs) epitaxially grown by molecular Jets (MBE) or vapor-phase organometallic growth (MOCVD) on a GaAs substrate. And for operation in spectral windows respectively situated around 1.3 and 1.5 micrometers, it is possible to select the vapor-phase organometallic system (GaInAs/InP) epitaxially grown on an InP substrate or even the MBE system (GaInAs/AlInAs) epitaxially grown on an InP substrate.

In all cases, it is possible to optimize the components obtained for functioning with a given wavelength by suitably selecting the thicknesses and compositions of the wells and barriers.

There now follows an example of a modulator embodied with the system (GaInAs/AlInAs) and conforming to the present invention.

Figures 9A, 9B:
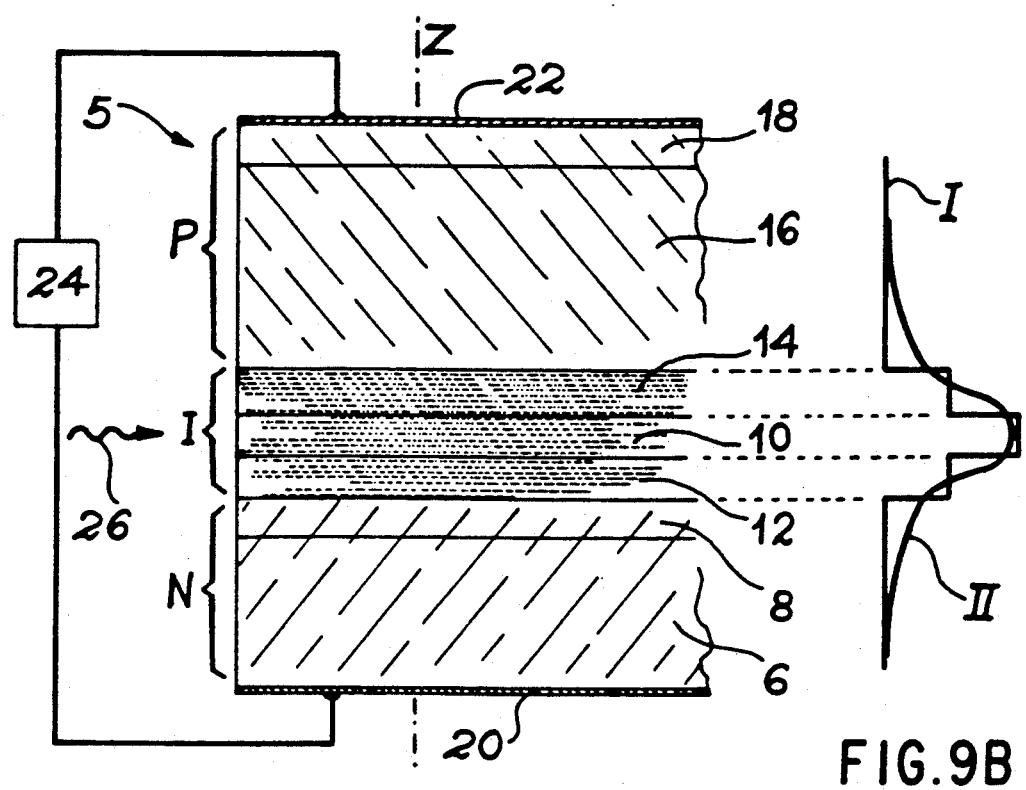
FIGS. 9A and 9B diagrammatically illustrate a modulation device conforming to the invention (A), this device including a PIN diode and also showing the corresponding optical index profile (B-I) and the profile of the intensity of the light guided by the zone I of the PIN diode (B-II)

The diagram of the epitaxial-grown structure of this modulator, the optical index profile corresponding to this structure and the profile of the luminous intensity of the guided wave are shown respectively in FIG. 9 at A, B-I and B-II.

The modulator of the present invention shown diagrammatically in FIG. 9-A includes a PIN type diode 5 which is obtained by epitaxy and whose intrinsic region I includes a tightly coupled supergrid 10 embodied with the system (GaInAs/AlInAs).

The region N of the diode includes an InP-n+ substrate 6 whose thickness may possibly be 80 micrometers and formed on this substrate is an AlInAs-n buffer-film 8 with a thickness of 0.1 micrometers.

The super-grid has in the diode 5 the largest optical index and includes 10 GaInAs films (not deliberately doped) each with a thickness of 6 nm, which alternate with 10 AlInAs films (not deliberately doped), each with a thickness of 1.5 nm.

The region I also includes identical multifilms 12 and 14 between which the super-grid is placed and whose optical indices are smaller than that of the super-grid but larger than those of the regions N and P, these latter indices being identical.

Each of the multifilms 12 and 14 include 12 GaInAs films (not deliberately doped), each with a thickness of 2.7 nm, which alternate with 12 AlInAs films (not deliberately doped), each with a thickness of 3.7 nm.

The region P of the diode includes an AlInAs-p confinement film 16 with a thickness of 2 micrometers. The region P further includes on the film 16 a GaInAs-p+ contact film 18 with a thickness of 0.1 micrometers.

FIG. 9-A shows the growth direction Z of the super-grid. This direction Z is perpendicular to the plane of the films of the super-grid.

Metallic films 20 and 22 are made of possibly gold and are respectively deposited on the free face of the substrate 6 and on the free face of the film 18. Suitable control means 24 are provided to apply a variable electric voltage V between the electrodes constituted by the metallic films 20 and 22.

In the diode 5, the electric field in the region I (not intentionally doped) is not nil when $V=0$ but is equal to the self-constructed electric field. It becomes nil for a polarization voltage V1 equal here to $-0.5$ V. A weal field parallel to Z is applied to the region I, thus causing the voltage V to vary from $V1=0.5$ V to $V2=+0.5$ V, which corresponds to an excursion of 1 V. By agreement the polarization voltages are counted positively in the inverse range of the diode.

In applications for transmitting digital signals in an optical form, the means 24 are provided to have V to move from V1 to V2 and vice versa.

The structure shown in FIG. 9-A is adapted tot he modulation of a luminous beam 26 rectilinearly polarized in the plane of the films (functioning TE) whose wavelength is about 1.5 micrometers. This beam 26 is produced by a suitable device, such as a laser diode (not shown), and is injected perpendicular to the direction Z and to the level of the super-grid 10 into one of the faces of the diode 5, this face being parallel to this direction Z, so that the maximum of the luminous intensity injected is located at the level of this super-grid (FIG. 9-B-II).

When V is equal to V1, the super-grid is transparent and the injected light traverses it with extremely low absorption. On the other hand, when V is equal to V2, the super-grid becomes opaque.

The two films 12 and 14 here made it possible to increase optical confinement, that is the percentage of the luminous energy contained in the super-grid, in the "guided waves" configuration.

However the super-grid (electro-absorbent) could also clearly occupy the entire intrinsic region I and the films 12 and 14 would then be suppressed.

Plane wave guides have been embodied in the form of strips with a width of 100 micrometers by engraving a compact PIN structure of the type of that of FIG. 9-A as far as the substrate. Electrodes have then been deposited on the side P and the side N. This has made it possible, by splitting, to obtain several copies of a wave guide with a length of 560 micrometers.

Figure 10:
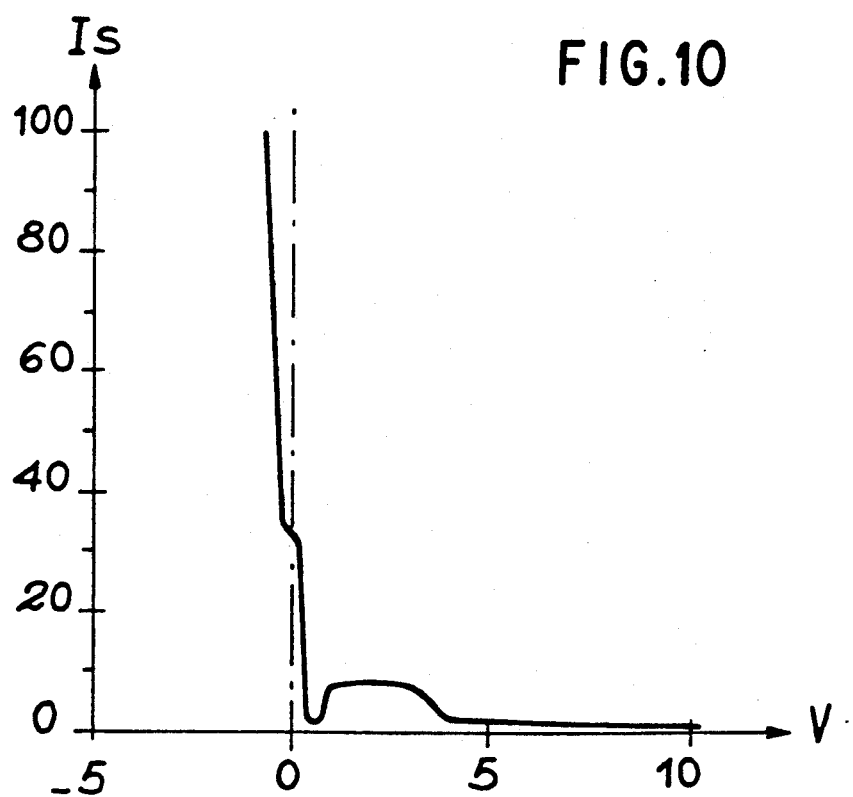
FIG. 10 shows the variations of the luminous intensity is at the output of a device of the type of that of FIG. 9 according to the inverse polarization voltage V applied to this device.

The characteristics of this wave guide used as a modulation device are given in FIG. 10 which shows the curve of the variations of the luminous intensity Is at the outlet of this device, this curve is expressed in arbitrary units according to the inverse voltage V applied to the PIN diode of the device so as to polarize this diode.

An extinction rate of 20 dB (99%) has been obtained with a luminous beam rectilinearly- polarized in the plane of the films of the super-grid (TE) with a wavelength equal to 1.55 micrometers and an electric control voltage equal to 1 V. Attenuation in the "on" state, which has been also measured, is less than 3 dB Narrow strip guides (with dimensional confinement) may easily be obtained by reducing the width of the strips which have been engraved.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for modulating the intensity of a luminous beam, comprising the steps of:

injecting a luminous beam into an electro-absorbent semiconductive element, wherein the electro-absorbent element includes a tightly coupled super-grid formed of films stacked along a direction constituting a growth direction of the super-grid, wherein the luminous beam is injected into the super-grid parallel to a plane of the films of this super-grid wherein this super-grid is provided to guide the injected luminous beam; and applying to this semiconductive element an electric field whose amplitude is made to gradually vary so as to vary the intensity of the luminous beam, wherein the electric field is weak and applied along the growth direction of the super-grid, thereby provoking the appearance of a low-energy oblique transition in a domain of wavelengths where the super-grid is transparent in the absence of any electric field, and wherein the super-grid is such that a wavelength of the luminous beam is contained in this domain.

2. A method according to claim 1, wherein a thickness of the super-grid is about 0.5 micrometers and wherein the electric field is obtained for a control voltage of about 1 V for controlling the semiconductive element;

3. A method according to claim 1, wherein the super-grid is included in a core of a luminous wave guide, this wave guide comprising two films between which the core is located and whose respective optical indices are smaller than the optical index of the super-grid.

4. A method according to claim 3, wherein the wave guide is a PIN type diode which is polarized, and whose intrinsic region I contains the super-grid and whose regions P and N have optical indices smaller than an optical index of the super-grid.

5. A method according to claim 1, wherein the wavelength of the luminous beam is about 1.5 micrometers and wherein the super-grid is comprised by a stacking of alternate GaInAs and AlInAs films.

6. A method according to claim 1, wherein the wavelength of the luminous beam is about 1.5 micrometers and wherein the super-grid is comprised by a stacking of alternate GaInAs and InP films.

7. A method according to claim 1, wherein the wavelength of the luminous beam is about 0.8 micrometers and wherein the super-grid is comprised by a stacking of alternate GaAs and GaAlAs films.

8. A device for modulating the intensity of a luminous beam, comprising:

an electro-absorbent semiconductive element to receive the luminous beam, wherein the electro-absorbent element includes a tightly coupled super-grid formed of films stacked along a direction which constitutes a growth direction of the super-grid, wherein the super-grid is provided to guide the luminous beam when the luminous beam is injected into the super-grid parallel to a plane of the films of the super-grid; and control means for applying to this semiconductive element an electric voltage and to gradually vary the amplitude of the voltage so as to vary the intensity of the luminous beam, wherein the control means are provided to apply an electric voltage which generates in the super-grid a weak electric field which is parallel to the growth direction of the super-grid, thereby provoking the appearance of a low-energy oblique transition in a domain of wavelengths where the super-grid is transparent in the absence of any electric field, and wherein the super-grid is such that a wavelength of the luminous beam is contained in this domain.

9. A method according to claim 8, wherein a thickness of the super-grid is about 0.5 micrometers and wherein the electric field is obtained for a control voltage of about 1 V for controlling the semiconductive element.

10. A method according to claim 8, wherein the supergrid is included in a core of a luminous wave guide, this wave guide comprising two films between which the core is located and whose respective optical indices are smaller than the optical index of the super-grid.

11. A method according to claim 10, wherein the wave guide is a PIN type diode which is polarized and whose intrinsic region I contains the super-grid and whose regions P and N have optical indices smaller than an optical index of the super-grid.

12. A method according to claim 8, wherein the wavelength of the luminous beam is about 1.5 micrometers and wherein the super-grid is comprised by a stacking cf alternate GaInAs and AlInAs films.

13. A method according to claim 8, wherein the wavelength of the luminous beam is about 1.5 micrometers and wherein the super-grid is comprised by a stacking of alternate GaInAs and InP films.

14. A method according to claim 8, wherein the wavelength of the luminous beam is about 0.8 micrometers and wherein the super-grid is comprised by a stacking of alternate GaAs and GaAlAs films.

* * * * *